(12) United States Patent
Giordano, III et al.

(10) Patent No.: US 6,285,364 B1
(45) Date of Patent: *Sep. 4, 2001

(54) METHOD AND APPARATUS FOR ORGANIZING AND DISPLAYING INTERNET AND TELEPHONE INFORMATION

(75) Inventors: Joseph Giordano, III, Seattle, WA (US); Udi Hanen, Bat Yam (IL)

(73) Assignee: Cisco Technology, Inc., San Jose, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/868,132

(22) Filed: Jun. 3, 1997

(51) Int. Cl.[7] .............................. G06F 3/00; H04M 11/08

(52) U.S. Cl. ......................... 345/347; 345/326; 345/339; 345/340; 379/93.23; 379/110.01; 455/566

(58) Field of Search ..................................... 345/326, 329, 345/332–335, 339–340, 342, 348, 978, 347; 370/352, 354, 356; 379/93.05–93.06, 93.17, 93.23–93.25, 110.01; 455/566; 709/300, 302, 310, 328

(56) References Cited

U.S. PATENT DOCUMENTS

| D. 398,298 | 9/1998 | Giordano, III | D14/114.2 |
|---|---|---|---|
| 5,250,940 | 10/1993 | Valentaten et al. | 345/189 |
| 5,276,801 * | 1/1994 | Heyen et al. | 345/501 |

(List continued on next page.)

FOREIGN PATENT DOCUMENTS

| 0630141A2 | 12/1994 | (EP) | H04M/3/42 |
|---|---|---|---|
| 0651544A2 | 5/1995 | (EP) | H04M/1/00 |
| 0797342A1 | 9/1997 | (EP) | H04M/11/08 |
| 2276520 | 9/1994 | (GB) | G06F/15/403 |
| 2306078 | 4/1997 | (GB) | H04M/1/274 |
| 94/29793 | 12/1994 | (WO) | G06F/9/44 |
| 95/29793 | 12/1994 | (WO) | G06F/9/44 |
| 96/32800 | 10/1996 | (WO) | H04M/1/00 |

OTHER PUBLICATIONS

"Internet Telephones", Netscape Communications Corp., p. 107–108, 110, 114, 117–120, Oct. 8, 1996.*
Mark Brown et al., "Using Netscape 3", QUE, p. 285–304, 1996.*
Portia Isaacson, "NetMeeting unites Internet strangers", Computer Reseller News, n695, p61(1), Aug. 5, 1996.*
"Netscape navigates its way to telephony", Computer Reseller News, issue 682, p. 67, May 6, 1996.*

(List continued on next page.)

*Primary Examiner*—Raymond J. Bayerl
*Assistant Examiner*—X. L. Bautista
(74) *Attorney, Agent, or Firm*—Thelen Reid & Priest LLP; David B. Ritchie

(57) ABSTRACT

An integrated graphical user interface is provided to both Internet and telephone function screens in an Internet access device. An integrated graphical user interface includes a home screen having selectable areas that represent a primary level of Internet and telephone functions. A telephone function screen automatically slides up to cover a portion of a previously-displayed screen in response to a selected condition, including receiving and initiating a telephone call. The slide-up window may also be manually controlled. The slide-up window displays information related to the telephone call being initiated or in progress. Selectable areas are provided for user control of call functions including answering, initiating a call, implementing telephone company services, and user defined functions. Upon termination of the selected condition, or upon user selection, the telephone function screen slides down to expose the previously displayed screen.

26 Claims, 4 Drawing Sheets

U.S. PATENT DOCUMENTS

| | | | |
|---|---|---|---|
| 5,305,435 | * | 4/1994 | Bronson .......................... 345/342 X |
| 5,500,929 | * | 3/1996 | Dickinson ....................... 345/340 X |
| 5,592,538 | * | 1/1997 | Kosowsky et al. ........... 379/93.17 X |
| 5,657,049 | * | 8/1997 | Ludolph et al. ................ 345/340 X |
| 5,745,109 | * | 4/1998 | Nakano et al. ...................... 345/340 |
| 5,764,756 | * | 6/1998 | Onweller .......................... 370/352 X |
| 5,784,001 | | 7/1998 | Deluca et al. .................. 340/825.44 |
| 5,799,063 | * | 8/1998 | Krane ................................. 379/88.17 |
| 5,844,979 | * | 12/1998 | Raniere et al. ............... 379/93.05 X |
| 5,856,827 | * | 1/1999 | Sudo ................................ 345/348 X |
| 5,867,495 | * | 2/1999 | Elliott et al. ......................... 370/352 |
| 5,874,958 | * | 2/1999 | Ludolph ............................... 345/339 |
| 5,887,139 | | 3/1999 | Madison, Jr. et al. ............... 709/223 |
| 5,889,774 | * | 3/1999 | Mirashrafi et al. .................. 370/352 |
| 5,918,016 | | 6/1999 | Brewer et al. .................... 395/200.5 |
| 5,958,016 | | 9/1999 | Chang et al. ........................ 709/229 |

OTHER PUBLICATIONS

"NetSpeak's New Version Of WebPhone", Newsbytes, Aug. 14, 1996.*

"The Internet Phone", Management Accounting, v. 74, issue 11, p. 36, Dec. 1996.*

"Internet Telephony . . . ", Edge, on & about AT&T, v11, p1(1), Dec. 1996.*

"Microsoft's NetMeeting . . . ", PC Week, v13, n22, p8(1), Dec. 1996.*

"Intel Internet Phone Beta Upgrade", Newsbytes, Dec. 1996.*

"Long–distance carrier industry bracing for Internet phones", Computing Canada, v22, n10, p31(2), Dec. 1996.*

"Quarterdeck To Bundle WebTalk With AMD Wavetable Technology", Newsbytes, Mar. 8, 1996.*

"Internet phone . . . ", Edge: Work–group Computing Report, v7, p2(1), Dec. 1996.*

"Dialing over the Net . . . ", CommunicationsWeek, n607, p39(1), Dec. 1996.*

"NetMeeting 2.0 to integrate directory, collaboration controls", PC Week, v13, n43, p77(1), Dec. 1996.*

* cited by examiner

METHOD AND APPARATUS FOR ORGANIZING AND DISPLAYING INTERNET AND TELEPHONE INFORMATION

BACKGROUND OF THE INVENTION

1. Technical Field

The invention relates to electronic communication systems. More particularly, the invention relates to a system for organizing and displaying Internet and telephone information on an Internet-capable appliance from databases distributed over an electronic network.

2. Description of the Prior Art

Electronic networks are increasingly being used to store and distribute a variety of data. Examples of such electronic networks include the Internet, and intranet systems. For example, a World Wide Web (Web) page may include text, graphical displays, video displays, animation, and sounds.

The Web is usually accessed via telephone lines by a modem-connected computer. However, the Web may also be accessed through other devices, including personal data assistants, fax machines, televisions, and Internet-capable telephones. One telephone that could be used to provide Web access is described in M. Valentaten, B. Moeschen, Y. Friedman, Y.-T. Sidi, Z. Bikowsky, Z. Peleg, Multi-Mode Home Terminal System that Utilizes a Single Embedded General Purpose/DSP Processor and a Single Random Access Memory, U.S. Pat. No. 5,259,940 (Oct. 5, 1993).

A Web page is most commonly encoded in Hypertext Markup Language (HTML), although other formats are available. HTML can be used to link text and/or images, such as icons, to another document or section of a document. The user activates a link by clicking on it, and the linked database is directly accessed. Links are used to access related information, or to contact a person or entity.

An Internet-capable telephone may connect to the Web, provide e-mail services, store an address book, as well as provide traditional telephone functions. In addition to such traditional functions, advanced functions may be provided that include caller ID, speed dial, call waiting, call forwarding, and redial.

However, Internet functions and traditional telephone functions often conflict. Telephone functions are typically interrupt functions. Thus, a telephone call may interrupt any Internet function. For example, a telephone call during a Web session may require termination of that session.

Furthermore, the screen size of an Internet-capable telephone is limited. In many personal computers, a common display technique, referred to as "windows" is used. However, there may not be sufficient available screen display space to permit the simultaneous display of an Internet graphical user interface, e.g. Including multiple windows, and a telephone function screen on an Internet-capable telephone. The display of a telephone function screen can therefore cause the user to lose track of Internet functions being performed at the time of the telephone call.

Because of the small screens, display "real estate" is very valuable. Several prior art schemes attempt to solve the problems inherent to use of such restricted screen display space. Screen organizers, such as status bars, tool bars, scroll bars, buttons, and menu bars, are frequently placed around the edges of the screen. Such screen organizers are used to provide access to functions, commands, or files that are not currently displayed on the screen.

However, such organizers still significantly limit the viewable area available to display data. Screen organizers are displayed and occupy screen real estate, even when they are not being used. For example, Web pages include not only the viewable display area but also controls for the browser functions. These controls remain on display whenever the browser application is active. Furthermore, these screen organizers are not automatically displayed and must be manually pulled down.

One presently available product, Le. Web TV, includes a slide-up window that is manually activated by the user. When activated, the window slides up to cover a previous screen display. The window is then manually de-activated, and retracts to show the original display. However, such slide-up window is not displayed automatically in response to specific operating conditions. Thus, the slide-up window is not interrupt-driven or context sensitive.

It would therefore be an advantage to provide a system that integrates Internet functions with traditional telephone functions. It would be a further advantage if such system provides a manually or automatically controlled user-friendly graphical user interface that maintains the context of a user's activities while permitting control of both Internet and telephone functions. It would be an additional advantage to provide an interrupt driven, context based, extension of available display real estate.

SUMMARY OF THE INVENTION

The invention provides a method and apparatus for organizing and displaying Internet and telephone information. The preferred embodiment of the invention is adapted for use with a communications appliance, such as an Internet-capable telephone. However, alternative embodiments of the invention are adapted for use with any Internet access device.

An integrated graphical user interface is provided for both of the Internet and telephone function screens. In the preferred embodiment of the invention, the integrated graphical user interface includes a home screen having selectable areas that represent a primary level of Internet and telephone functions, referred to herein as contexts. Screens for related functions are hierarchically organized within each context. Each lower level screen displays a selectable area that returns to the home screen. The selectable areas are preferably implemented as large buttons on a touch-sensitive screen. Within a selected context, each display screen has a context-sensitive button bar displaying some or all of the available functions within that context.

A telephone function screen automatically slides up to cover a portion of a previously-displayed screen in response to a selected condition or interrupt. The previously displayed screen is not entirely covered during the telephone session. Significantly, this allows the user to remain aware of the context of any existing session or function. In the preferred embodiment of the invention, such condition may include receiving or initiating a telephone call. The slide-up window may also be manually controlled by the user.

In this example, the slide-up window displays information related to the telephone call being initiated or in progress. Additionally, the slide-up window includes selectable areas that permit the user to control functions relating to the telephone call.

Such functions include answering the telephone, initiating a call, implementing telephone company services such as caller ID or call forwarding, and user defined functions, such as adding information to an address book. Upon termination of the selected condition, for example, hanging up the telephone, the telephone function screen slides down to expose the previously displayed screen. In addition, the slide-up window can be "put away" manually after it was activated by the telephone, but the user can remain on the telephone.

Text or icon representations may be used to represent information on a screen. One embodiment of the invention is upgradeable via downloading from the Web. New features and programmable icons may thereby be added to the Internet-capable telephone.

DETAILED DESCRIPTION OF THE INVENTION

The invention provides a method and apparatus for organizing and displaying Internet and telephone information. The preferred embodiment of the invention is adapted for use, for example, with the Internet-compatible telephone described in M. Valentaten, B. Moeschen, Y. Friedman, Y.-T. Sidi, Z. Bikowsky, Z. Peleg, Multi-Mode Home Terminal System That Utilizes a Single Embedded General Purpose/DSP Processor and a Single Random Access Memory, U.S. Pat. No. 5,250,940 (Oct. 5, 1993). However, alternative embodiments of the invention are adapted for use with any Internet access device. Thus, the following discussion is provided for purposes of example and not as a limitation on the scope of the invention.

The state of this art provides tool bars, buttons, and tabs to allow a user to navigate among different sections or functions of an Internet-compatible telephone or similar device. However, the display screen real estate occupied by such tool bars, buttons, and tabs is significant, and therefore consumes a disproportionate amount of the smaller display screen typically provided by Internet access devices and Internet-capable telephones. The invention provides an approach that minimizes such excessive use of screen display real estate by including an interrupt driven, context sensitive graphical user interface (GUI) that integrates functionality for both Internet and telephone functions.

Figure 1:
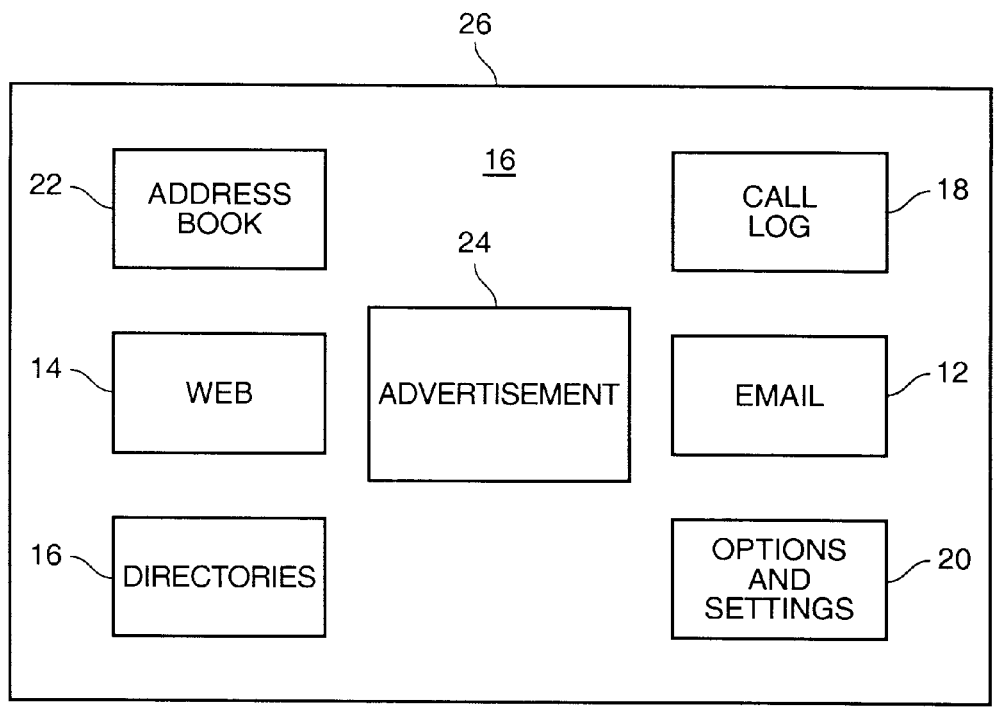
FIG. 1 is a front view of the home screen, according to the invention.

FIG. 1 is a front view of a Home Screen 10, according to the invention. The home screen displays a menu of the main features of the Internet-compatible telephone. Such main features, referred to herein as contexts, include Internet functions, such as directories 16, e.g. White and Yellow Pages, Web 14, Email 12, address book 22, call log 18, and Options and Settings 20. The Options and Settings button accesses a suite of functions and user-settable attributes, such as ISP access information, Email configuration information, telephone ring, sound, automatic polling, frequency for checking Email, and speed dial setup. Accordingly, very little display space remains for added functionality if the user is to be available to retrieve and read information on the display. This is especially important when such added functionality is context sensitive or/and interrupt driven, e.g. Initiating a telephone call.

For example, if an advertisement 24 is to be displayed in an unoccupied portion of any screen, display space must be reserved for such advertisement. This advertising can be for the user's company, or can be sold to outside entities, such as the telephone company or an Internet access provider. However, such space is not available if context sensitive and/or interrupt driven functions are always displayed. Thus, the state of the art clutters the display with infrequently used or out-of-context functions at the cost of lost display space, e.g. Lost advertising revenue, compressed, and therefore hard to read, Web pages, truncated Web pages and Email, and compromised utility.

In the preferred embodiment of the invention, in the Home screen, selectable areas are preferably displayed as large, user-friendly buttons on a touch-sensitive screen 26. Each selectable area defines a context. Alternative embodiments of the invention use a pointer device, handwriting recognition, or a keypad to allow selection of the desired context. The selectable areas may also be indicated by other means, such as different colors, text references, or pictorial icons. However, for the purposes of example only, and without limiting the scope of the invention, these selectable areas are referred to as buttons in this application.

Figure 2:
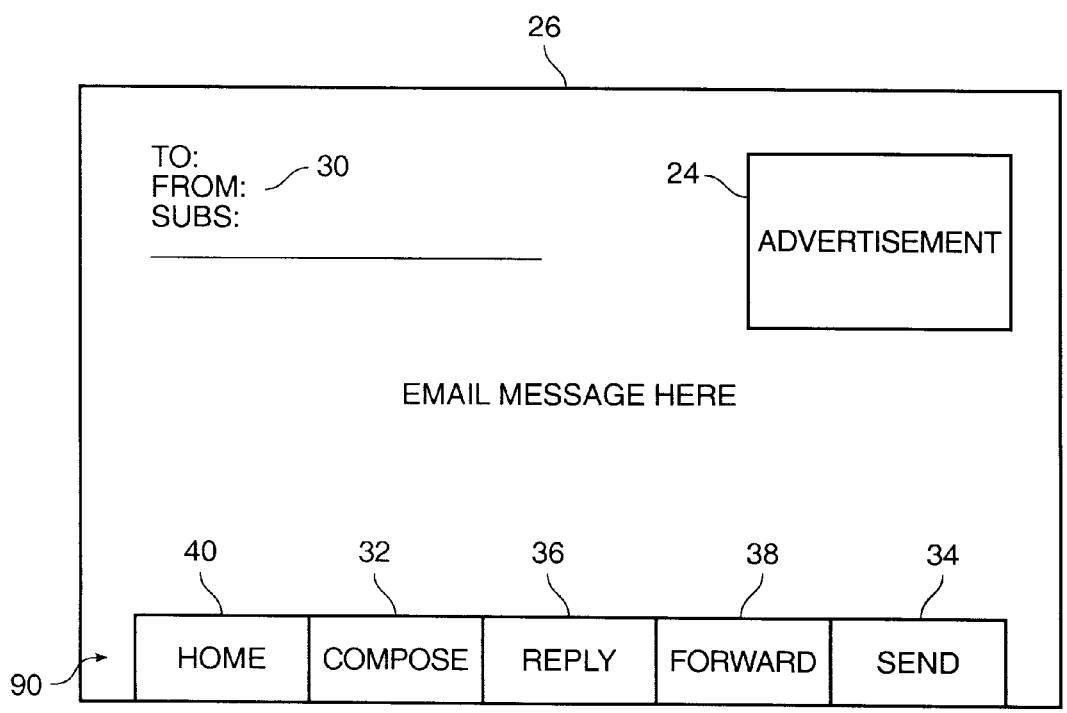
FIG. 2 is a front view of a main context screen according to the invention.

When a user selects a button, a main screen is displayed that represents a primary level of functions related to that context. FIG. 2 is a front view of a main context screen for the Email button 12 selected in FIG. 1. In FIG. 2, a button bar 90 is shown. Screens for related functions may be hierarchically organized within each context. For example, the Web browser context may have sub-screens for bookmarks, searching, or to show a history of where the user has been. The E-mail context 30 may have screens for composing 32, sending 34, replying 36, and forwarding 38 messages. Every displayed screen has a button 40 that returns to the home screen, and buttons relating to other function levels of the area. Thus, a user can easily find screens located in different contexts. In a preferred embodiment of the invention, a screen's configuration and functions may be customized by the user or by the telephone company or Internet service provider.

Within a selected context, each display screen 26 may have a context-sensitive button bar. This button bar displays some or all of the available functions within that context. The user can therefore easily switch between accessible functions such as Compose Email, Send Email, and Forward Email.

Figure 3:
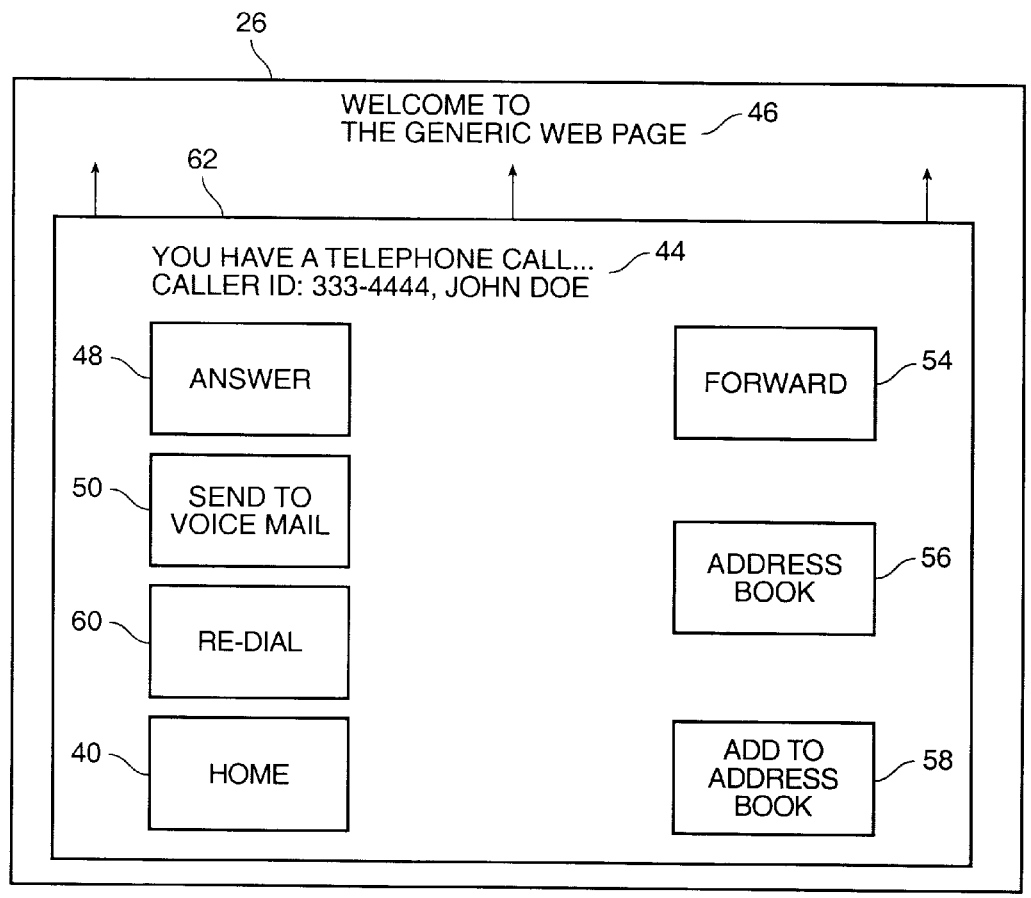
FIG. 3 is a front view showing the slide-up window for telephone functions according to the invention.

To minimize the usage of display screen space, a telephone function screen automatically slides up to cover a portion of a previously-displayed screen in response to a selected condition, I.e. A slide-up screen provides additional functionality on an interrupt driven and/or context sensitive basis. The previously displayed screen is preferably not entirely covered during the telephone session. Significantly, this allows the user to remain aware of the context of the existing session or function. FIG. 3 is a front view showing the slide-up window 44 according to the invention. In the preferred embodiment of the invention, such selected condition includes interrupt-driven features such as receiving or initiating a telephone, e.g. call by picking up the handset. Upon termination of the selected condition, for example, hanging up the telephone (or if ringing ceases), the slide-up window slides down to expose the previously displayed screen 46. The slide-up window may also be manually controlled by the user. The actual implementation of the slide-up window is accomplished using various known programming techniques. For example, screen borders, the speed at which it appears to slide, and other graphic and animation effects may be programmed into the Internet-compatible telephone GUI. In the preferred embodiment of the invention, it is a slightly different color to differentiate it from the previous screen.

The slide-up window displays information related to the telephone call being initiated or in progress. Additionally, the slide-up window includes buttons to permit the user to control telephone call functions within the context, such as answering 48. Alternatively, when the telephone handset is removed from its cradle, a slide-up screen appears and a telephone call may be initiated by selecting an address book 56 and selecting a button representing a particular telephone number. The Internet-compatible telephone determines how to initiate the call. Other such functions include selection of telephone company services, such as caller ID 52, and user defined functions, such as adding information to an Address Book 58. It should be appreciated that only those buttons appropriate for the context are displayed on the slide-up screen. Thus, in use, the slide-up screen will not typically display all of the buttons shown on FIG. 3 at the same time.

In the preferred embodiment of the invention, the slide-up window has a re-dial button 60. Another feature stores a list 62 of the most recent telephone numbers dialed or received, if caller ID is implemented. A telephone call to one of those numbers is initiated by selecting it from the list. Caller ID information can be compared with the address book and added to the list, if desired. Additionally, speed dial numbers may be displayed on the slide-up window when a call is initiated.

The slide-up window may also include a button that permits the user to route a telephone call to voicemail 50, or to forward the call to another person 54.

Thus, in the preferred embodiment of the invention, when a call is received, the telephone slide-up window appears, and provides the caller ID information for the telephone call. If the recipient does not wish to speak with the caller, the recipient may route the call to a secretary, or to a voice mail box.

Figure 4:
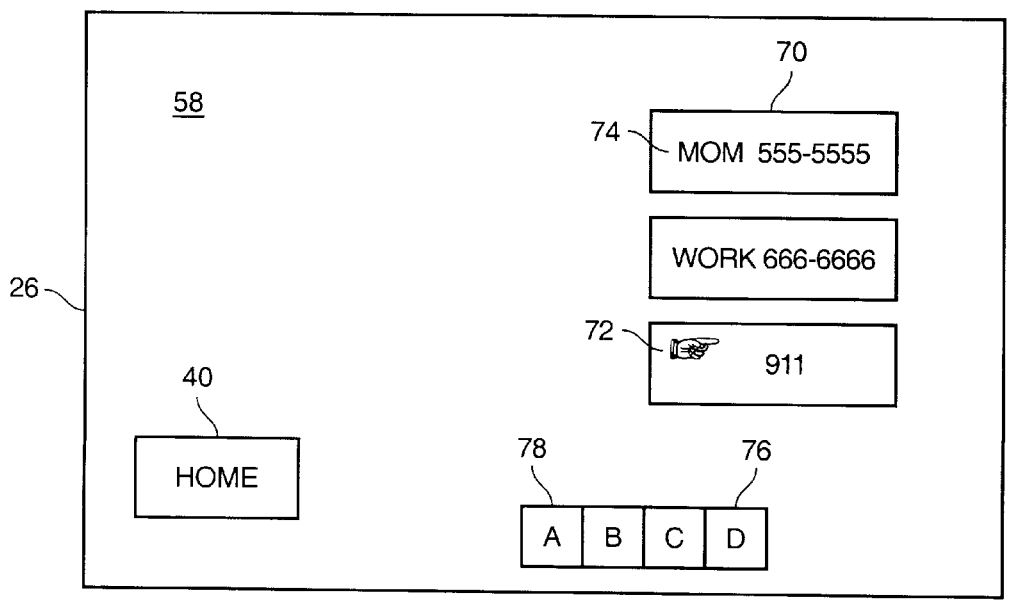
FIG. 4 is a front view of the Address Book, according to the invention.

The user may also download or compose icons for use in connection with a slide-up screen. FIG. 4 is a front view of an Address Book 58 according to the invention. For example, in an address book list 70, icons 72 may be assigned on a related slide-up screen. Additionally, a telephone slide-up screen may include icons that represent Police or Fire Department numbers in a speed dialer, while text listings are used for friends and relatives. These icons may replace any portion of the text listing, such as the name only, or may replace the entire listing, such as name and telephone number. Such programmable icons are especially useful for small children who cannot read the text listings for emergency services. They are also amusing to children. One embodiment provides a Web page that enables programming and downloading of such icons, as well as providing a library of icons.

In the preferred embodiment of the invention, a button bar 76 may be provided on the home screen 44 to display one or more buttons 78 that call an appropriate slide-up window.

For that context, this allows a user to call a slide-up screen manually, or to put away a slide-up screen that was automatically called by an interrupt or context.

One embodiment of the invention is upgradeable via downloading from, for example, the Web. The slide-up display may thereby be readily modified to provide new features or update existing features. Additionally, coding may be provided, for example by telephone companies, to revise the look-and-feel and features of the slide-up window. Thus, the slide-up window can be provided with a button that will access a service center and allow the user to activate additional services or modify existing services or user profiles. For example, from a telephony slide-up display, a user may request such services as voice mail or caller ID, or may modify services currently available with the user account. The coding required to implement this service may then be downloaded automatically from the telephone company Web site.

Palettes containing programmable icons may also be downloaded from the Web. These palettes permit the user to customize the screen displays, as desired.

Figure 5:
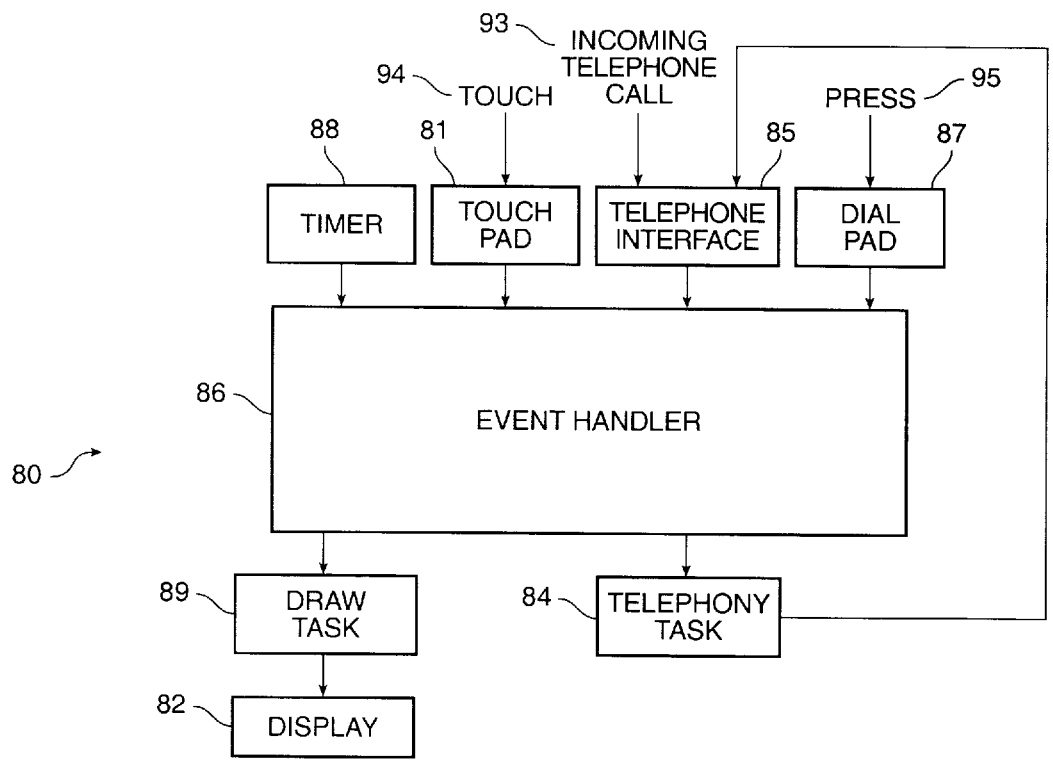
FIG. 5 is a block schematic diagram of an apparatus for organizing and displaying Internet and telephone information according to the invention.

FIG. 5 is a block schematic diagram of an apparatus 80 for organizing and displaying Internet and telephone information according to one embodiment of the invention. The actual apparatus may be implemented in a system as described in U.S. Pat. No. 5,250,940 (referenced above). In such system that Internet-compatible telephone may be a stand-alone client for direct connection to an Internet service provider (ISP), or it may be part of a proprietary network. In either case, connections are provided to a telephone service provider (TELCO) via telephone interface 85 for telephone functions, and to an ISP (not shown) for Internet functions. These connections may be to separate telephone lines, or shared telephone line, an ISDN line, or to a communication network, all as is known in the art. The Internet-compatible telephone includes a display 82, a user input device, such as a touchpad 81, optionally integrated with the display, a telephone dial pad 87 for composing telephone numbers, a draw task 89 for drawing the various screens on the display, as well as for generating the slide-up window, and a telephone task 84 for monitoring and implementing telephone functions, e.g. for initiating a telephone call; and an event handler 86. The event handler is responsible for implementing the features herein disclosed by integrating the various resources of, for example, the Internet-compatible telephone. Significantly, the event handler generates interrupts that control the display of the slide-up window upon the occurrence of predefined events or context-based triggers, such as an incoming telephone call 93, touching 94 the touch pad, pressing 95 the dial pad, or a timer 88 event. The apparatus may also include an HTML or other protocol module (not shown) for Internet functions.

Figure 6:
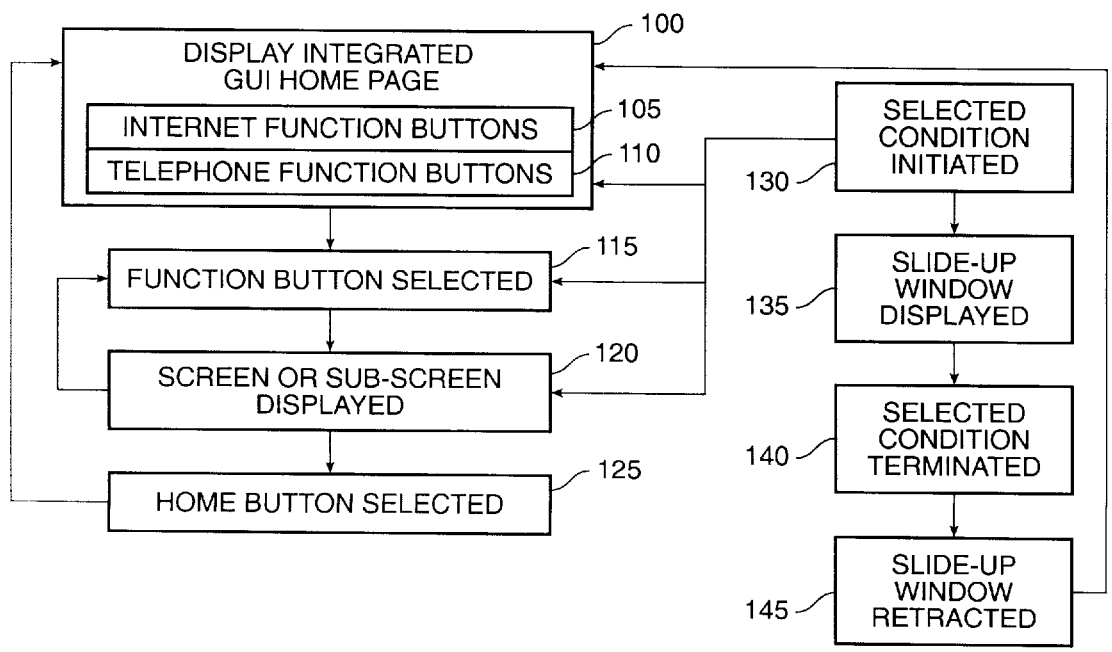
FIG. 6 is a flowchart of the method for organizing and displaying Internet and telephone information, according to the invention.

FIG. 6 is a flowchart of the method for organizing and displaying Internet and telephone information, according to a preferred embodiment of the invention. The displayed integrated GUI 100 includes Internet function buttons 105 and telephone function buttons 110. When a function button is selected 115, the corresponding sub-screen is displayed 120. For each screen in the hierarchy, the selection of a function button displays the corresponding sub-screen. The selection of the Home button from any of the screens or sub-screens 125 returns the display to the home screen of the integrated GUI 100.

When a selected condition is initiated 130, for example an interrupt or context based event, such as lifting the telephone receiver from its cradle to initiate a telephone call (or selecting other telephony features, such as a speaker phone, or typing on a keypad for on-hook dialing), the slide-up window appears 135. The termination of the selected condition 140 causes the slideup window to retract 145.

Figure 7:
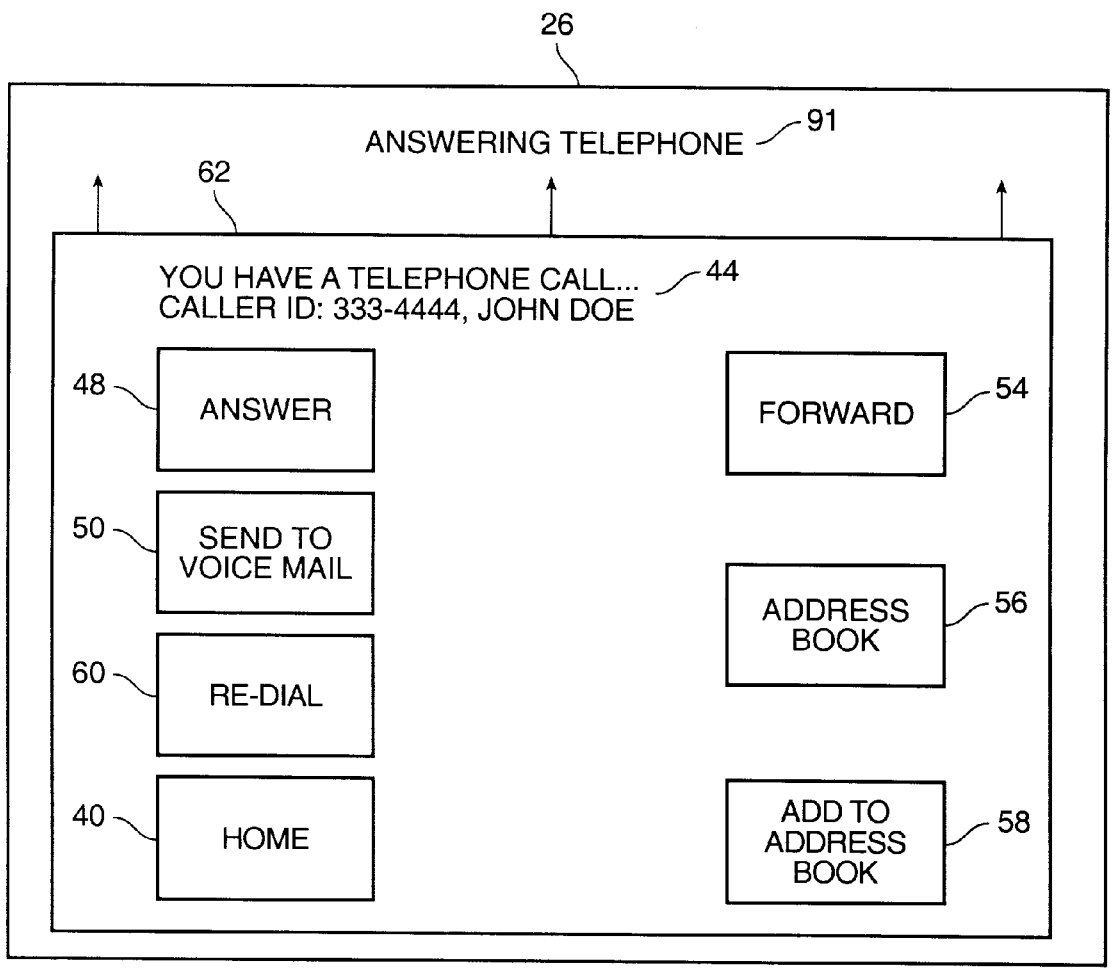
FIG. 7 is a block schematic diagram of a slide-up window according to the invention.

FIG. 7 shows a slide-up window according to the invention. In this embodiment, if the slide-up window is present (as shown), input events such as key inputs to the slide-up, e.g. Pressing the answer button 48, are received by the active context 91 behind the slide-up window.

Although the invention is described herein with reference to the preferred embodiment, one skilled in the art will readily appreciate that other applications may be substituted for those set forth herein without departing from the spirit and scope of the present invention.

For example, the invention may be provided with special notification features. A timer function 88 (FIG. 5) is used to slide-up the telephone screen at specified times when telephone calls need to be initiated. An alarm feature provides special notification, such as a specific icon, when a call is received from a designated telephone number. Thus, if caller ID indicates a telephone call from the user's employer, the slide-up window indicates that the call is important. Animated (e.g. GIF format) files may be used as a part of a screen or a programmable icon. For example, a speed dialer can be assigned an animated GIF as its icon.

The slide-up window can also be provided for other interrupt-driven applications. For example, the appropriate screen slides up when Email is received or during a periodic check for new Email.

Accordingly, the invention should only be limited by the Claims included below.

What is claimed is:

1. A method for organizing and displaying internet and telephone information and functions, comprising the steps of:
providing an integrated user interface for internet and telephone function;
slidably displaying an interrupt-driven, context-sensitive telephone function screen automatically in response to a selected condition, to cover at least a portion of a previously-displayed screen.

2. The method of claim 1, further comprising the steps of:
recognizing the termination of said selected condition; and
slidably retracing said telephone function screen in response thereto to expose said previously-displayed screen.

3. The method of claim 1, further comprising the step of:
displaying said Internet and telephone function screens as selectable areas on said integrated graphical user interface.

4. The method of claim 3, further comprising the step of:
hierarchically organizing related functions as sub-screens within said Internet and telephone function screens.

5. The method of claim 1, wherein at least one of said integrated graphical user interface, Internet function screens, telephone function screens, or sub-screens is user-customizable.

6. The method of claim 1, further comprising the steps of:
displaying an indexed telephone number on said telephone function screen; and
initiating a telephone call to said telephone number in response to selection of said telephone number.

7. The method of claim 6, wherein said index is one of a text representation or an icon.

8. The method of claim 7, wherein said icon is programmable.

9. The method of claim 1, further comprising the steps:
displaying one or more calling features on said telephone function screen; and
initiating said calling features upon selection thereof.

10. The method of claim 1, wherein said selected condition is interrupt or context based.

11. The method of claim 1, wherein said integrated graphical user interface is displayed on an Internet access device.

12. The method of claim 11, wherein said Internet access device is an Internet-compatible telephone.

13. The method of claim 11, further comprising the steps of:
downloading either of information and functions during an Internet session; and
configuring said access device with either of said information and functions.

14. A method for integrating Internet and telephone functions in an Internet capable telephone, comprising the steps of:
providing an integrated graphical user interface to Internet and telephone unction screens;
displaying said Internet and telephone function screens as selectable areas on said integrated graphical user interface;
hierarchically organizing related functions as sub-screens within said internet and telephone function screens;
slidably displaying an interrupt-driven, context-sensitive telephone function screen automatically in response to a selected condition, to cover at least a portion of a previously-displayed screen;
recognizing the termination of said selected condition; and
slidably retracting said telephone function screen automatically in response thereto to expose said previously-displayed interface.

15. The method of claim 14, further comprising the steps of:
displaying an indexed telephone number on said telephone function screen; and
initiating a telephone call to said telephone number in response to selection of said indexed telephone number.

16. The method of claim 15, wherein said index is one of a text representation or an icon.

17. The method of claim 16, wherein said icon is programmable.

18. The method of claim 14, further comprising the steps:
displaying one or more calling features on said telephone function screen; and
initiating said calling features upon selection thereof.

19. The method of claim 14, wherein at least one of said integrated graphical user interface, Internet function screens, telephone function screens, or sub-screens is user-customizable.

20. The method of claim 14, wherein said selected condition is an interrupt or context driven.

21. The method of claim 14, wherein said integrated graphical user interface is displayed on an Internet access device.

22. The method of claim 14, wherein said Internet access device is an Internet-compatible telephone.

23. The method of claim 14, further comprising the steps of:

downloading either of information and functions during an Internet session; and configuring said Internet-capable telephone with either of said information and functions.

24. An apparatus for organizing and displaying Internet and telephone information, comprising:

a draw task used by said apparatus for providing an integrated graphical user interface to Internet and interrupt-driven, context-sensitive telephone function screens;

a draw task for displaying a telephony function on said telephone function screen;

a telephony task for initiating a telephone call to said telephone number in response to selection of said indexed telephone number; and an event handler used by said apparatus for automatically displaying said telephone function screen in response to a selected condition to cover at least a portion of a previously-displayed screen, said draw task retracting said telephone function screen automatically in response to the termination of said selected condition to expose said previously-displayed screen.

25. The apparatus of claim 24, further comprising:

a telephone interface for downloading either of information and functions during an Internet session;

wherein the configuration of said Internet-capable telephone is modified with either of said information and functions.

26. An access appliance, comprising:

a telephone for receiving and displaying Internet information; and a draw task used by said telephone to provide an integrated graphical user interface for Internet functions and telephone functions; and an event handler which recognizes an interrupt or context-based event and causes said draw task to slide up a telephone function screen automatically in response thereto; wherein said event handler recognizes the termination of said event and causes said draw task to slide down said telephone function screen automatically in response thereto.

* * * * *